United States Patent
Kim et al.

(10) Patent No.: US 7,116,863 B2
(45) Date of Patent: Oct. 3, 2006

(54) THERMALLY ACTUATED WAVELENGTH TUNABLE OPTICAL FILTER

(75) Inventors: Chang Kyu Kim, Daejeon-Shi (KR); Myung Lae Lee, Daejeon-Shi (KR); Chang Auck Choi, Daejeon-Shi (KR); Chi Hoon Jun, Daejeon-Shi (KR); Yun Tae Kim, Daejeon-Shi (KR)

(73) Assignee: Electronics and Telecommunications Research Institute, Daejon-Shi (KR)

( * ) Notice: Subject to any disclaimer, the term of this patent is extended or adjusted under 35 U.S.C. 154(b) by 255 days.

(21) Appl. No.: 10/819,271

(22) Filed: Apr. 7, 2004

(65) Prior Publication Data

US 2005/0105849 A1    May 19, 2005

(30) Foreign Application Priority Data

Nov. 13, 2003 (KR) .................. 10-2003-0079987

(51) Int. Cl.
*G02B 6/26* (2006.01)
(52) U.S. Cl. .............. 385/27; 385/18; 385/25
(58) Field of Classification Search .......... 385/27, 385/18, 25
See application file for complete search history.

(56) References Cited

U.S. PATENT DOCUMENTS

| | | | |
|---|---|---|---|
| 6,341,039 B1 | 1/2002 | Flanders et al. | |
| 6,373,632 B1 | 4/2002 | Flanders | |
| 6,400,738 B1 | 6/2002 | Tucker et al. | |
| 6,438,149 B1 | 8/2002 | Tayebati et al. | |
| 2002/0167730 A1* | 11/2002 | Needham et al. | 359/578 |
| 2003/0043157 A1* | 3/2003 | Miles | 345/540 |
| 2004/0027671 A1* | 2/2004 | Wu et al. | 359/578 |
| 2005/0052746 A1* | 3/2005 | Shih et al. | 359/578 |

OTHER PUBLICATIONS

Tayebati et al. Microeleromechaqical tunable filter with stable half symmetric cavity, Electronics Letters, Oct. 1st 1998, vol. 34, No. 20.*
F. Riemenschneider, et al.; "Low-Cost Electrothermally Tunable Optical Microcavities Based on GaAs"; IEEE Photonics Technology Letters, vol. 14, No. 11; Nov. 2002; pp. 1566-1568.

(Continued)

*Primary Examiner*—Kaveh Kianni
(74) *Attorney, Agent, or Firm*—Mayer, Brown, Rowe & Maw LLP (57) ABSTRACT

Provided is a wavelength tunable optical filter of a micro-electro-mechanical system (MEMS). The wavelength tunable optical filter comprises two optical fibers or optical waveguides having their optical axes aligned to each other, two lens for collimating light at leading ends of the optical fibers or optical waveguides, two or more mirrors formed on a substrate, thermal actuators supporting at least one of the mirrors, wherein one of the mirrors is actuated by thermal expansion of the actuator. Because all mirrors are formed on a substrate, a manufacturing process is simple and an initial resonance wavelength can be precisely adjusted. Since the thermal expansion is generated by the electrical current directly flowing through the thermal actuators, it can be actuated by a low consumption power. Also, since an electrostatic force is not used to move the mirrors, a sticking phenomenon between the mirrors does not occur, and the wavelength can be tunable in a wide range. Since the planar mirrors are arranged in parallel, the light alignment is easily performed, the line width is constant and the insertion loss is low.

9 Claims, 10 Drawing Sheets

OTHER PUBLICATIONS

T. Amano, et al.; "Design and Fabrication of GaAs-GaAlAs Micromachined Tunable Filter With Thermal Strain Control"; Journal of Lightwave Technology, vol. 21, No. 3; Mar. 2003; pp. 596-601.

Sören Irmer, et al.; "Ultralow Biased Widely Continuosly Tunable fabry-Pérot Filter"; IEEE Photonics Technology Letters, vol. 15, No. 3; Mar. 2003; pp. 434-436.

M. C. Larson, et al.; "Vertical Coupled-Cavity Microinterferometer on GaAs with Deformable-Membrane Top Mirror", IEEEPhotonics Technology Letters, vol. 7, No. 4; Apr. 1995; pp. 382-384.

Connie J. Chang-Hasnain; "Tunable VCSEL"; IEEE Journal on Selected Topics in Quantum Electronics, vol. 6, No. 6; Nov./Dec. 2000; pp. 978-987.

Chang-Kyu Kim, et al.; "47nm Tuning of Thermally Actuated Fabry-Perot tunable Filter with Very Low Power Consumption"; 0-7803-7830-X/03; 2003 IEEE; MC8; pp. 38-39.

P. Tayebati, et al.; "Microelectromechanical tunable filter with stable half symmetric cavity"; Electronics Letters; 1st Oct. 1998; vol. 34; No. 20; pp. 1967-1968.

P. Meissner, et al.; "Micromachined Two-Chip WDM Filters with Stable Half Symmetric Cavity and their system integration"; 2002 Electronic Components and technology Conference; pp. 34-41.

W. T. Lin, et al.; "A photonic device compatible process in fabricating tunable Fabry-Perot filter"; Optics Communications 210 (2002) ; Sep. 15, 2002; pp. 149-154.

D. Hohlfeld et al.; "A thermally tunable silicon-based optical filter"; Sensors and Actuators A 103 (2003) ; pp. 93-99.

P. Bondavalli, et al.; "Opto-mechanical design of tuneable InP-based Fabry-Përot filter for gas analysis"; Sensors and Actuators A 94 (2001) ; pp. 136-141.

\* cited by examiner

THERMALLY ACTUATED WAVELENGTH TUNABLE OPTICAL FILTER

BACKGROUND OF THE INVENTION

1. Field of the Invention

The present invention relates to a wavelength tunable optical filter for inputting or outputting light with a desired wavelength in an optical communication system of a wavelength division multiplexing (WDM) scheme and, more particularly, to a wavelength tunable optical filter operated by a thermal actuation.

2. Description of the Related Art

An optical communication system using a wavelength division multiplexing (WDM) scheme sends/receives optical signals of various channels each of which has a different wavelength, through an optical fiber, and needs a process of combining or splitting light having a desired wavelength at each of terminal and node. For this process, a wavelength tunable filter is used. The prior art wavelength tunable filter is comprised so that the distance between distributed bragg reflectors (DBR's) is shortened by an electrostatic force, as a voltage is applied between the distributed bragg reflectors (DBR's) alternatively stacked and made of semiconductors or dielectric materials, which have a different refractive index. The wavelength tunable filter by an electrostatic force has the actuation range limited to less than ⅓ of an initial gap between the two mirrors, since two mirrors are stuck when the distance between the two mirrors is less than ⅔ of the initial gap. Also, in the case where the number of DBR pairs increases in order to raise wavelength selectivity, the thickness of the actuator is also increased. Thus, the actuation voltage is rapidly increased. In this case, since an additional high voltage generator is needed, the manufacturing cost is increased. If the actuation voltage exceeds a critical value, a discharge between the two mirrors occurs and an insulator is damaged, thereby the elements can be no longer used. Accordingly, in order to prevent the above problems, the methods for manufacturing the mirrors and the actuators with different material or different thickness have been studied. However, there is a disadvantage in that the methods are too much complicated.

Recently, actuation methods using thermal expansion have been studied in order to solve these problems.

One of them makes use of a principle that, when a cantilever joined up and down by two materials having a different thermal expansion coefficient is heated, bending occurs toward the material having a smaller thermal expansion coefficient (T. Amano et al., J. Light wave Technol., vol. 21, pp 596~601, 2003). Namely, after manufacturing a cantilever type actuator joined up and down by two materials having a different thermal expansion coefficient, one side of the actuator is fixed to an anchor and the other side is connected to a mirror. The cantilever is bent in an upward or downward direction by heat generated when electrical current flows between two electrodes on the anchor, thereby the mirror connected to the end of the cantilever also moved such that the distance between the mirrors increases or decreases. Accordingly, the motion direction of the mirror can be determined by relatively enhancing the thermal expansion coefficient of the upper or the lower part of the cantilever structures in the initial manufacturing process. This method has a problem that, since the one side of the mirror is fixed to the cantilever, the two mirrors initially set to parallel to each other are sloped as the cantilever is curved, thereby the line width becomes wide and the transmissivity of light becomes low. Meanwhile, since the heat generated at the anchor as the electrical current flows is transferred to the cantilever, a part of heat is lost at the anchor and the remaining heat is used to actuate the mirror. Accordingly it has a disadvantage in that the efficiency is low and the power consumption is high.

The other one makes use of longitudinal thermal expansion of the actuator. Namely, four actuators supporting a mirror are connected to electrodes two by two, and then, when electrical current flows from one electrode to the other, heat is generated from the actuators, thereby the length of the actuator is increased and it is bent in a direction where the mirrors moves away from each other (F. Riemenschneider et al. IEEE Photon. Technol. Lett., vol. 14, pp. 1566~1568, 2002). This structure is manufactured in such a manner that two substrates on which mirrors have been formed respectively are joined with the mirrors facing each other and then one of the substrate is removed from the other. At this time, to prevent the two mirrors from being attached each other, one of the mirrors is composed of two materials having a different intrinsic stress so that the mirror is naturally deformed in a convex form in the process of removing the substrate. However, since this method makes it difficult to constantly reproduce the radius of curvature of the mirror convexly transformed and the gap between the two substrates, it has a disadvantage in that initial gap between the two mirrors is not constant. Also, if the distance between the two mirrors is denoted by 'd' and the refractive index of the material existed between the two mirrors is denoted by 'n', the free spectral range (FSR) $\Delta\lambda$ of adjacent resonant wavelengths can be defined as $\lambda^2/2nd$. Since the initial distance, d, between the two mirrors becomes tens of μm, FSR is less than tens of nm. Accordingly, even though the actuation distance is over 100 nm, the available wavelength tuning range is limited to tens of nm by FSR. In addition, since the convex mirror is used, if a beam waist of the incident light is not precisely adjusted to a curvature of the curved mirror, then the transmission line width becomes wide. Therefore the wavelength selectivity is decreased, while the insertion loss is increased.

SUMMARY OF THE INVENTION

Accordingly, in order to solve the prior art problems, the present invention is directed to simplifying a manufacturing process as all the mirrors are formed on a single substrate using a crystal growth technique, and embodying an reproducibility of an initial length of a resonator.

Further, the present invention is directed to guaranteeing actuation having a wide wavelength tuning range with low power consumption by allowing thermal actuators supporting mirrors to be actuated by heat expansion resulting from electrical current flowing directly through the thermal actuators Further, the present invention is directed to having characteristics that the transmission line width is narrow and the insertion loss is low, as planar mirrors are actuated in a parallel state.

According to an aspect of the present invention, there is provided a wavelength tunable optical filter, comprising: two optical fibers or optical waveguides, in which their optical axes are aligned to each other; lenses for incident light and output light positioned between the optical fibers or optical waveguides; mirrors positioned between the lenses and formed to face each other with an air gap formed therebetween on a substrate; and thermal actuators supporting at least one of the mirrors; wherein one of the mirrors is actuated upward or downward by thermal expansion of the actuator caused by an electrical current.

Preferably, both sides of one of the mirrors are connected to inner ends of thermal actuators, and wherein spacers are inserted between each outer end of the thermal actuators and each end of the other mirror which has a length elongated to outer ends of the thermal actuators, so as to keep a predetermined distance therebetween.

Preferably, the thermal actuators are formed to be parallel to both sides of the mirror and connected to the mirror by supporters, wherein spacers are inserted between one ends of the thermal actuators and both opposite ends of the other mirror adjacent to the one ends of the thermal actuators respectively, so as to keep a certain distance therebetween.

Preferably, the thermal actuators are connected to both sides of the mirror in a first direction, and wherein spring members are connected to both other sides of the mirror or the thermal actuators in a second direction perpendicular to the first direction to prevent sloping, wherein further comprising spacers are inserted between one ends of the thermal actuators and both opposite ends of the other mirror adjacent to the one ends of the thermal actuators respectively, so as to keep a certain distance therebetween.

Preferably, the wavelength tunable optical filter further comprises a permanent magnet or an electromagnet for forming magnetic fields in a direction perpendicular to that of the electrical current flowing through the thermal actuators.

BRIEF DESCRIPTION OF THE DRAWINGS

The above and other features and advantages of the present invention will become more apparent to those of ordinary skill in the art by describing in detail preferred embodiments thereof with reference to the attached drawings in which.

DETAILED DESCRIPTION OF THE INVENTION

The present invention will now be described more fully hereinafter with reference to the accompanying drawings, in which preferred embodiments of the invention are shown.

Figure 1:
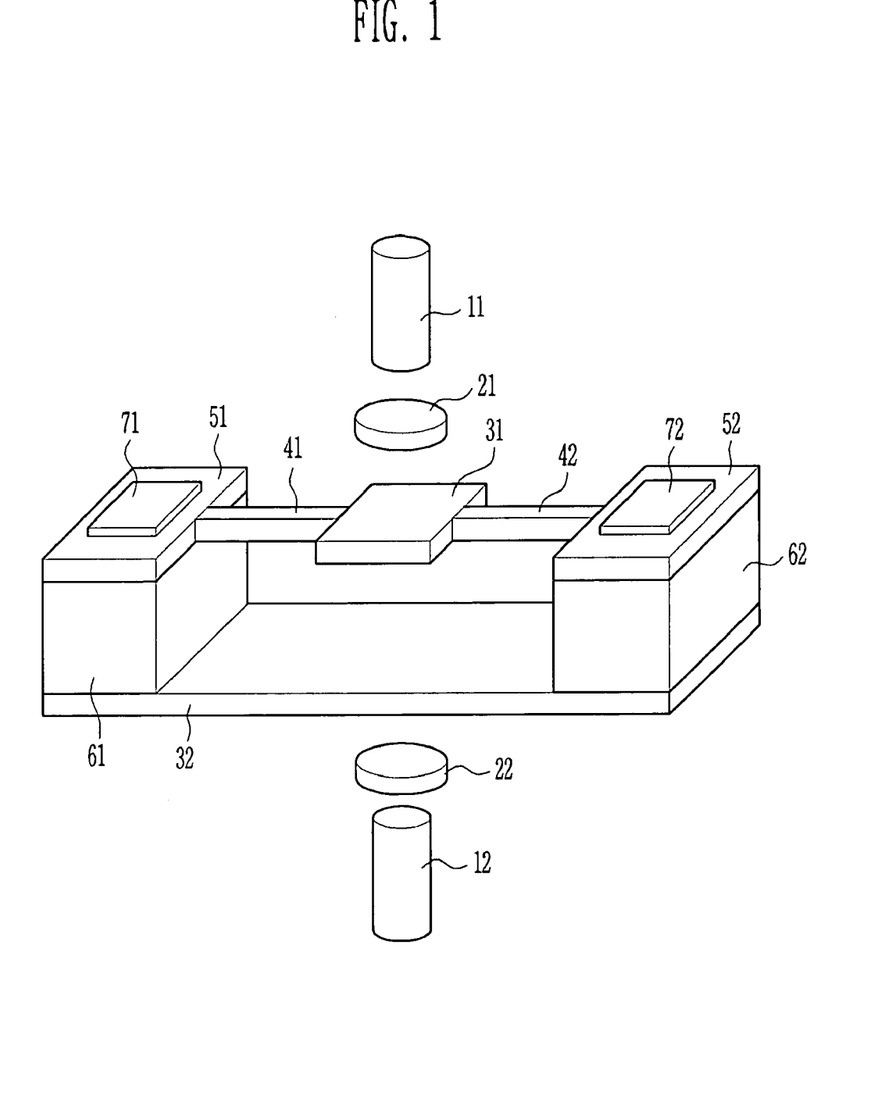
FIG. 1 is a structural view of a thermally actuated wavelength tunable filter according to a first embodiment of the present invention.

FIG. 1 is a structural view of a thermally actuated wavelength tunable filter according to a first embodiment of the present invention.

Two optical fibers or optical waveguides 11 and 12, in which their optical axes are aligned to each other, are placed apart from each other. Lenses 21 and 22 are each positioned on the leading end of each of the optical fibers or optical waveguides 11 and 12 in order to collimate light. A pair of mirrors 31 and 32 facing each other with an air gap formed therebetween is positioned between the two lenses 21 and 22. Both ends of the mirror 31 are supported by thermal actuators 41 and 42 so that it can move upward or downward. The mirror 32 is fixedly formed without the thermal actuators. Each of spacers 61 and 62 is disposed between end portion 51 of the thermal actuator 41 and one end portion of the mirror 32 and between end portion 52 of the thermal actuator 42 and the other end portion of the mirror 32, respectively. The spacers 61 and 62 keep the distance between the mirrors 31 and 32 while an external force is not applied thereto. Electrodes 71 and 72 are formed on the surfaces of the end portions 51 and 52, respectively.

The light incident through the optical fiber or optical waveguide 11 of an input terminal is collimated by the lens 21, and then passes through a Fabry-Perot resonator formed by the two mirrors 31 and 32. Here, the Fabry-Perot resonator transmits only the light of resonant wavelength $\lambda_{FP}$ determined by an effective cavity length $L_{\textit{eff}}$ of the resonator between the two mirrors 31 and 32. The relationship between the effective cavity length and the resonant wavelength can be described as the following Equation 1. The light transmitting the Fabry-Perot resonator is collected at the opposite lens 22 and then is incident upon the optical fiber or optical waveguide 12 of an output terminal.

$$L_{\textit{eff}} = m \frac{\lambda_{FP}}{2} \quad \text{[Equation 1]}$$

Here, m denotes natural number.

The present invention uses thermal expansion of the thermal actuator to adjust the distance between the mirrors 31 and 32 in both directions. When a voltage is applied between the electrodes 71 and 72, the electrical current flows through the thermal actuators 41 and 42 having a predetermined resistance and the mirror 31 positioned therebetween, thereby generating heat therein. Then the thermal actuators 41 and 42 are thermally expanded by the heat. Even if the thermal expansion occurs inside the plane including the thermal actuators 41 and 42 and the mirror 31, since both end portions 51 and 52 are fixed by the spacers 61 and 62, the thermal actuators 41 and 42 are bent up or down. Thus the mirror 31 supported by the thermal actuators 41 and 42 moves upward or downward. As a result, the distance between the two mirrors 31 and 32 is increased or decreased. In the above-mentioned structure, heat is generated while the electrical current flows through the thermal actuators 41 and 42, and the heat causes the thermal actuators 41 and 42 to be expanded. Comparing with the prior art structure that heat generated in the fixed portion is transmitted through the cantilever, the present invention is efficient and can be actuated with a low consumption power.

When manufacturing the wavelength tunable filter constructed as shown in FIG. 1, in order to simplify the manufacturing process and to constantly reproduce the distance between the two mirrors 31 and 32, the present invention uses a method to form all of the two mirrors 31 and 32 on a single substrate using a crystal growth technique. Referring to FIGS. 2A to 2G, the manufacturing method of a thermally actuated wavelength tunable filter according to a preferred embodiment of the present invention will be explained below.

Figure 2A:
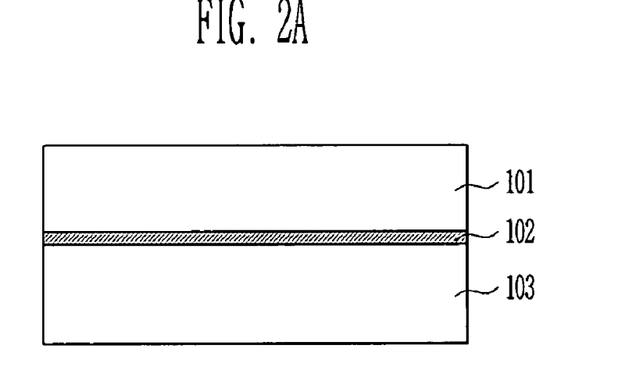
FIGS. 2A to 2G are cross-sectional views for explaining manufacturing procedures of a thermally actuated wavelength tunable filter according to the present invention.

Referring to FIG. 2A, a lower mirror layer 103, a sacrificial layer 102 and an upper mirror layer 101 are sequentially formed on a substrate (not shown). The lower mirror layer 103, the sacrificial layer 102 and the upper mirror layer 101 are formed by molecular beam epitaxy (MBE), chemical vapor deposition (CVD), metal-organic chemical-vapor deposition (MOCVD), and plasma-enhanced chemical vapor deposition (PECVD), and etc.

Figure 2B:
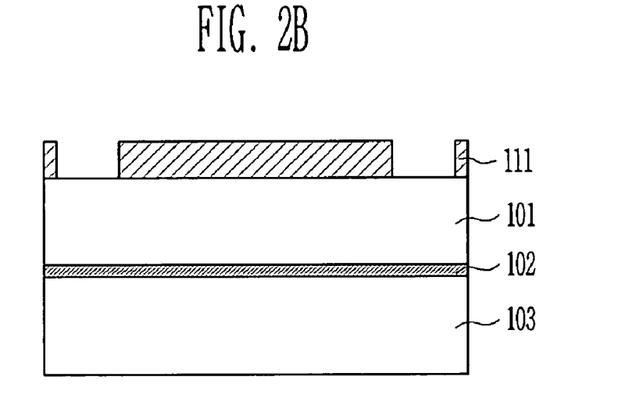

Referring to FIG. 2B, after the upper mirror layer 101 is coated with a mask material such as photo resist (PR) or PMMA, a mask pattern 111 having a shape inverse to that of the electrode is formed thereon using a lithography process.

Figure 2C:
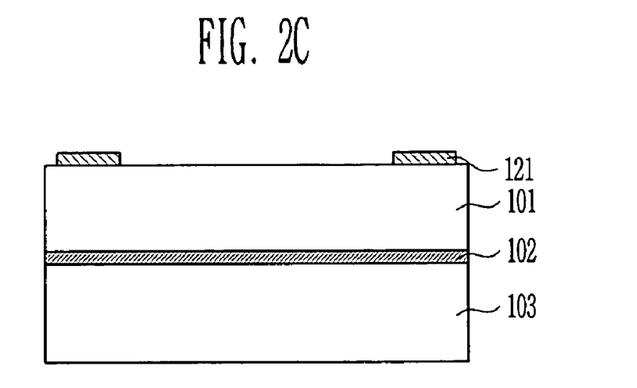

Referring to FIG. 2C, after an entire upper surface is deposited with a conductive material, the mask pattern 111 is removed so that electrodes 121 are formed on the surface of the upper mirror layer 101. In a general manufacturing process of semiconductor devices, the electrodes are formed in the latter half of the entire process, but in the present invention, in order to prevent a sticking phenomenon, since the lithography process cannot be performed after removing the sacrificial layer 102, the electrodes 121 are formed before the process of removing the sacrificial layer 102.

Figure 2D:
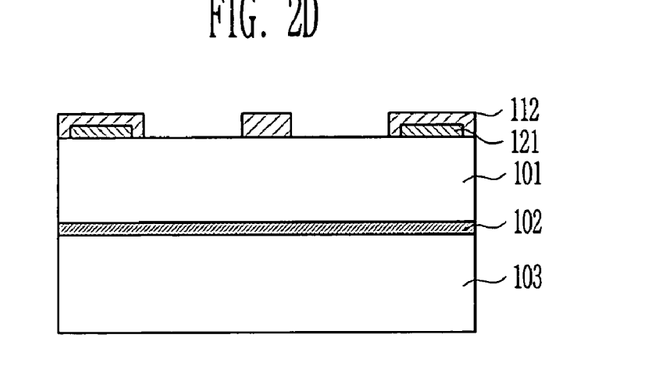

Referring to FIG. 2D, after the entire upper surface is covered with the mask material again, the lithography process is performed to leave a mask pattern 112 only on a predetermined area including the electrodes 121, an area where the upper mirror is intended to be formed, and an area where the thermal actuators supporting the upper mirror is intended to be formed. The used mask material has a large etching selectivity with regard to materials composing the lower mirror layer 103, the sacrificial layer 102 and the upper mirror layer 101. For example, depending on the etching process, the photo resist or PMMA can be used. In addition, a dielectric material such as $SiN_x$ or $SiO_x$ may be used.

Figure 2E:
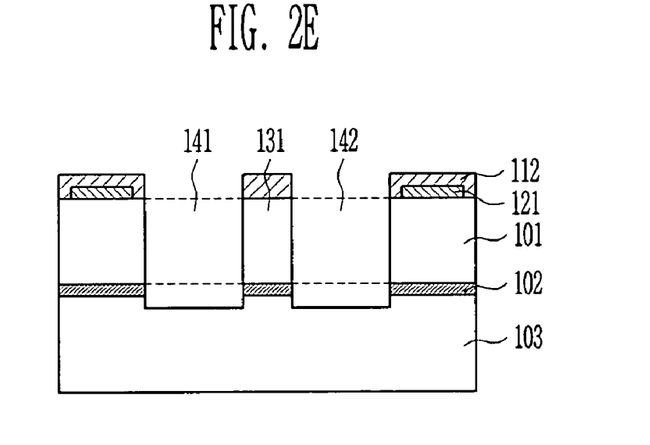

Referring to FIG. 2E, the exposed portion of the upper mirror layer 101, the sacrificial layer 102 and the lower mirror layer 103, which are exposed without being covered with a mask pattern 112, are sequentially etched at a partial or whole thickness by means of the first etching process using the mask pattern 112 as an etching mask, and thus the upper mirror 131 and the thermal actuators 141 and 142 supporting the upper mirror 131 are formed. Since it is important to perform the vertical etching process, the dry etching is preferable to the wet etching.

Figure 2F:
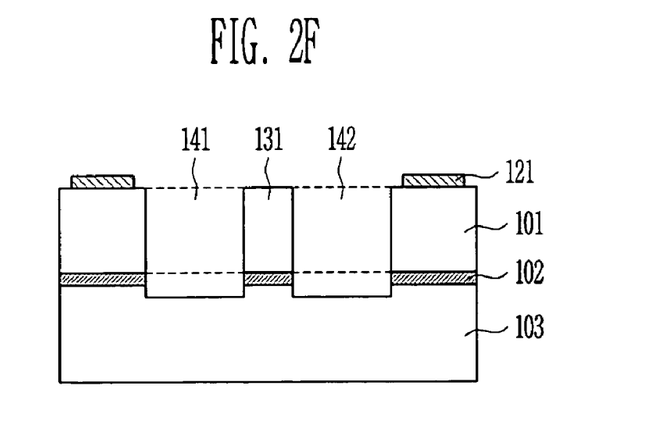

Referring to FIG. 2F, the mask pattern 112 is removed.

Figure 2G:
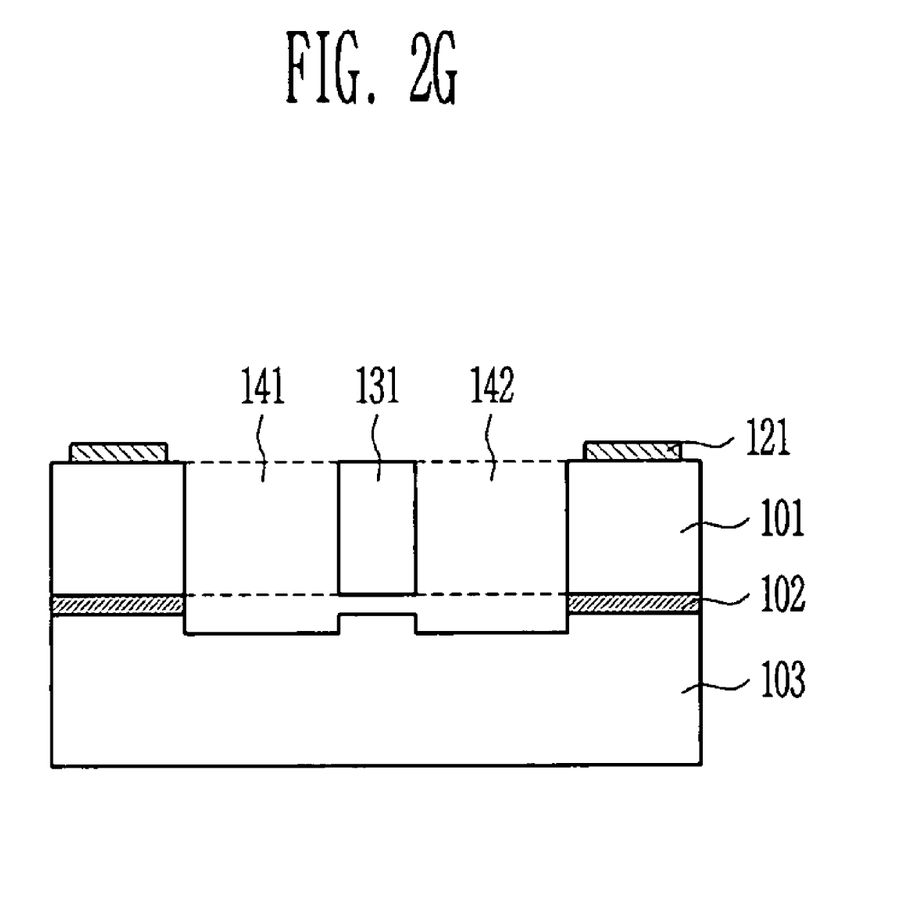

Referring to FIG. 2G, a second etching process is performed in order to remove the sacrificial layers 102 remaining between the upper mirror layer 131 and the lower mirror 103 and between the thermal actuators 141 and 142 and the lower mirror 103. Here, the sacrificial layers 102 remaining between the end portions of the thermal actuators 141 and 142 formed with electrodes 121 and the end portions of the lower mirror 103 are used as the spacers (61 and 62 of FIG. 1) for keeping the distance between the upper mirror 131 and the lower mirror 103 within a predetermined extent. The second etching process is performed by use of solutions or gases, which are allowed to etch the material constituting the sacrificial layer 102, but not the materials constituting the upper and lower mirrors 131 and 103.

The beam spring structure where the thermal actuators 41 and 42 are connected to both sides of the mirror 31 has been described with reference to FIG. 1. However, the present invention can be applied to any thermal actuator structure capable of adjusting the distance between the mirrors 31 and 32 using thermal expansion generated by the electrical current. Also, even though it is illustrated that only the mirror 31 is connected to the thermal actuators 41 and 42 and the mirror 32 is fixed, the two mirrors 31 and 32 may be connected to the thermal actuators respectively, so as to move independently.

Figure 3A:
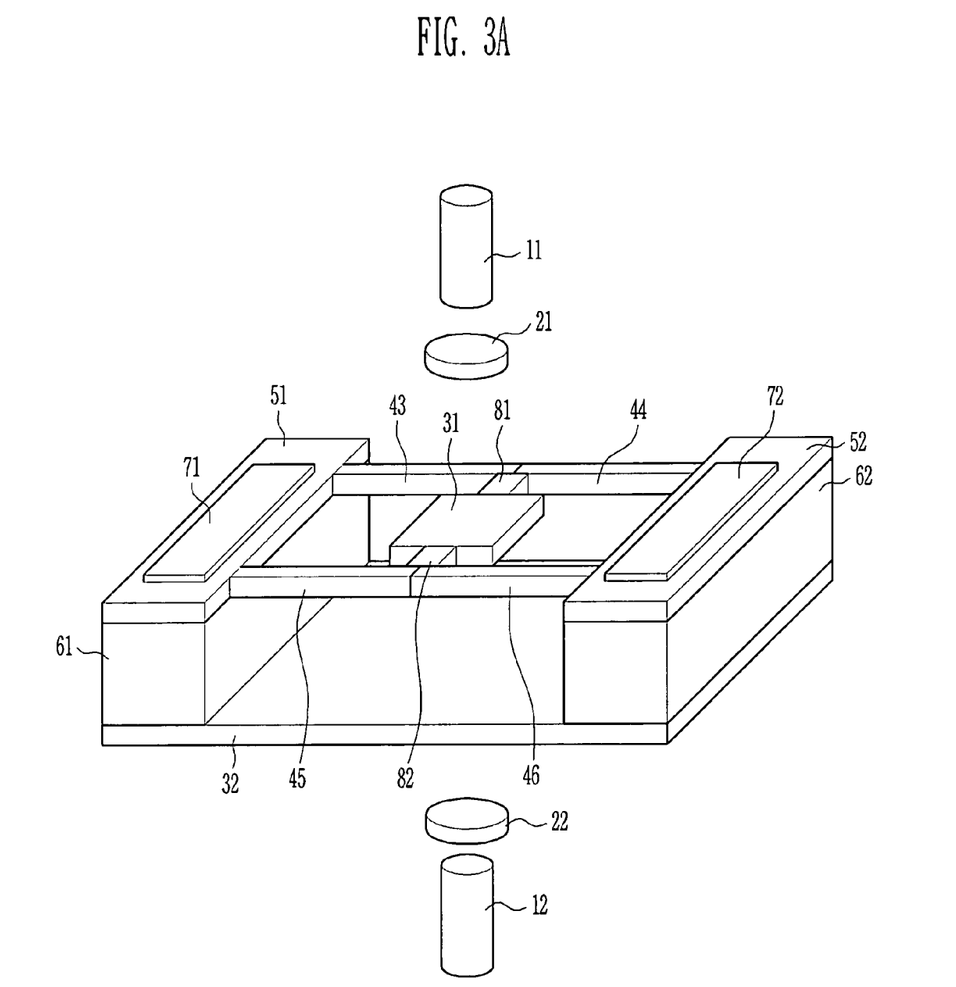
FIG. 3A is a structural view of a thermally actuated wavelength tunable filter according to a second embodiment of the present invention.

FIG. 3A is a structural view of a wavelength tunable filter according to the second embodiment of the present invention, which includes thermal actuators configured to prevent the electrical current from flowing through the mirror.

Figure 3B:
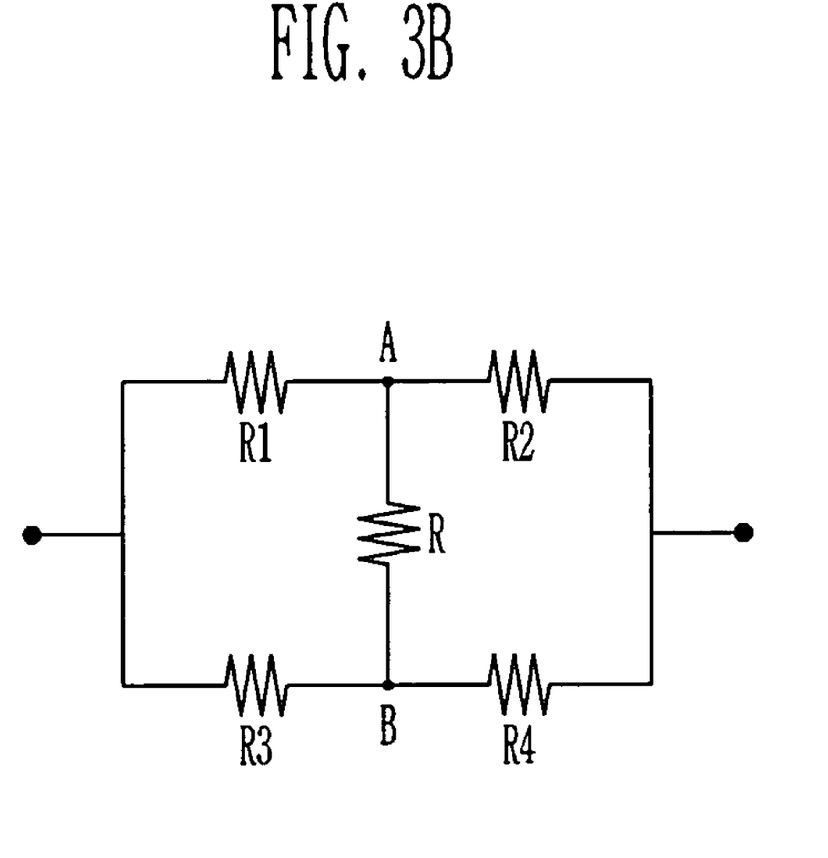
FIG. 3B is an equivalent circuit diagram of FIG. 3A.

In the wavelength tunable filter configured like FIG. 1, since mirror 31 is positioned between the thermal actuators 41 and 42, light absorption is increased by charges while electrical current flows, or resonant wavelength may be changed because of the change in the physical properties of the material forming the mirror 31. Also, since the entire structure including the thermal actuators 41 and 42 and the mirror 31 is bent, the inside of the mirror is deformed. Thus the optical characteristic may be differently shown according to the polarization of the incident light. Accordingly, as shown in FIG. 3A, the present invention includes thermal actuators 43, 44, 45 and 46 parallel to both sides of the mirror 31 such that the thermal actuators 43, 44, 45 and 46 are connected to the mirror 31 by supporters 81 and 82. Namely, as the mirror is supported by the four thermal actuators 43, 44, 45 and 46 and the supporters 81 and 82 positioned at the middle between them, the electrical current can be prevented from directly flowing through the mirror. The mirror is kept parallel, even though the thermal actuators are curved. FIG. 3B is an equivalent circuit to that of FIG. 3A. Assuming that each resistance of the thermal actuators 43, 44, 45 and 46 is denotes by R1, R2, R3 and R4, and that a resistance between the supporter 81 and 82 and the mirror is denoted by R, and that the relationship between the resistances is R1/R2=R3/R4, a Wheatstone bridge is formed. Then, since points A and B of FIG. 3B become equipotential, the electrical current does not flow through the resistance R.

The motion direction of the mirror caused by thermal expansion is initially determined either by a fine stress difference inherently existing in the entire structure including the thermal actuators 41 and 42 and the mirror 31 or temperature distribution due to the un-uniform flow of electrical current. In order to solve this uncertainty, the resistances of the upper and lower portions of the thermal actuators are differently set to generate a temperature difference. Alternatively, the inherent stress is intentionally generated to be bent in one direction.

Figure 4:
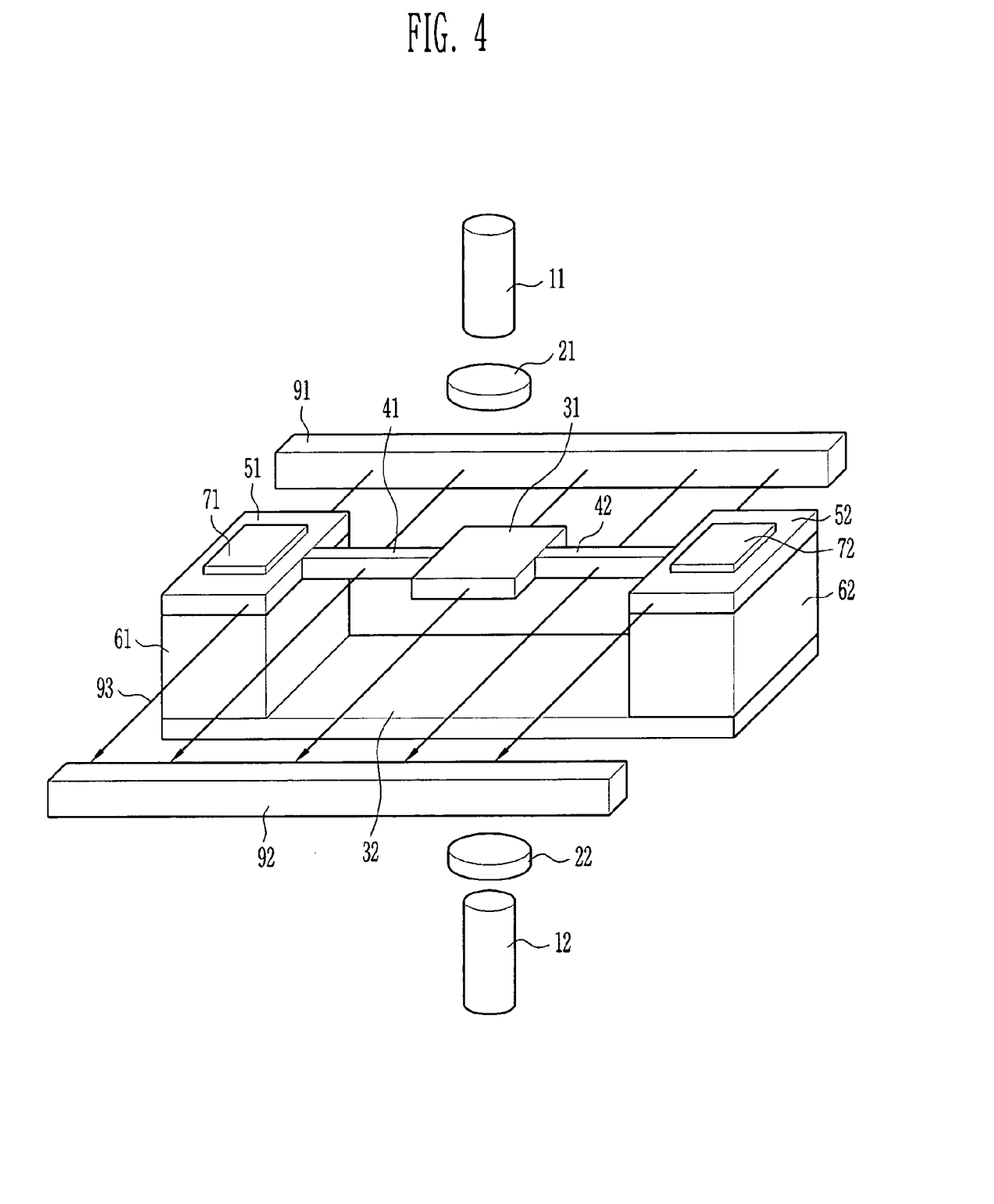
FIG. 4 is a structural view of a thermally actuated wavelength tunable filter according to a third embodiment of the present invention.

FIG. 4 is a structural view of a wavelength tunable filter according to a third embodiment of the present invention, in which the structure is adapted to determine an actuation direction by an external magnetic field.

The actuation direction can be determined according to the electrical current direction. To this end, the external magnetic field perpendicular to the electrical current direction is applied within the plane including the thermal actuators 41 and 42 and the mirror 31 using permanent magnets or electromagnets 91 and 92. This method based on the Lorenz force has an advantage in that, even after manufacturing elements, the initial actuation direction can be selected, as the electrical current direction is changed from outside. Namely, as shown in FIG. 4, when the magnetic flux 93 comes from the rear to the front and the electrical current flows from the left electrode 71 to the right electrode 72, the Lorenz force acts downward. As a result, the two mirrors 31 and 32 move in the direction that they approach to each other. Meanwhile, when the magnetic flux 93 comes from the rear to the front and the electrical current flows from the right electrode 72 to the left electrode 71, the Lorenz force acts upward. As a result, the two mirrors 31 and 32 move in the direction that they move away from each other. Because the actuation direction by thermal expansion and the application direction of the Lorenz force are identical to each other, the wavelength can be tunable in a wider range even when the same electrical current flows, comparing with the case free from the external force.

Also, in the case that both sides of the mirror is supported by the two thermal actuators as shown in FIG. 1, the mirror can be pivoted about the thermal actuator and sloped during the thermal expansion. Thereby the transmission wavelength may be unstable and the resulting line width may become wide.

Figure 5:
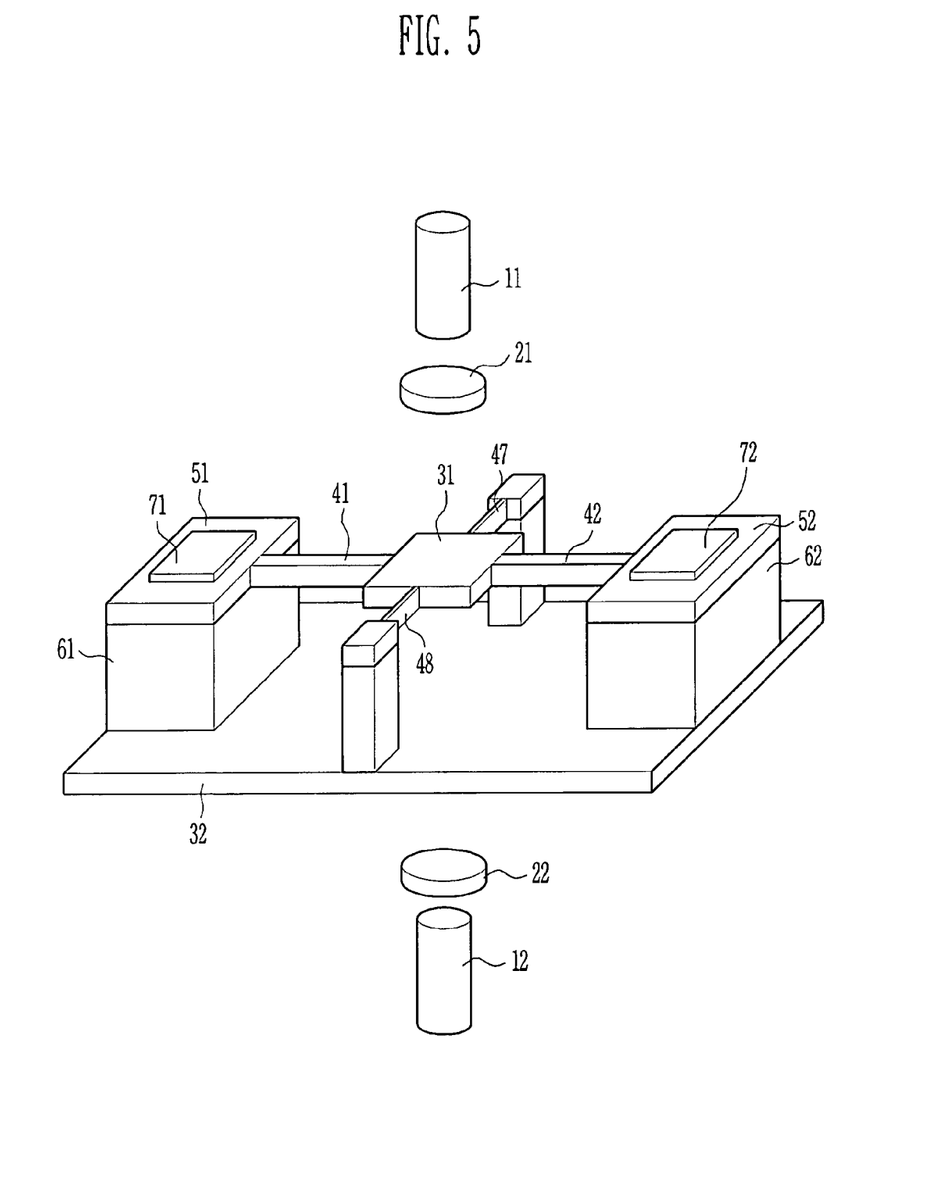
FIG. 5 is a structural view of a thermally actuated wavelength tunable filter according to a fourth embodiment of the present invention.

FIG. 5 is a structural view of a wavelength tunable filter according to a fourth embodiment of the present invention, in which the structure is adapted to symmetrically connect the mirror 31 to new spring members 47 and 48 perpendicular to the thermal actuators 41 and 42 through which the electrical current flows in order to prevent sloping due to the rotation of the mirror. Alternatively, new spring members may be symmetrically connected to the thermal actuators to prevent the thermal actuators from twisting.

Figure 6:
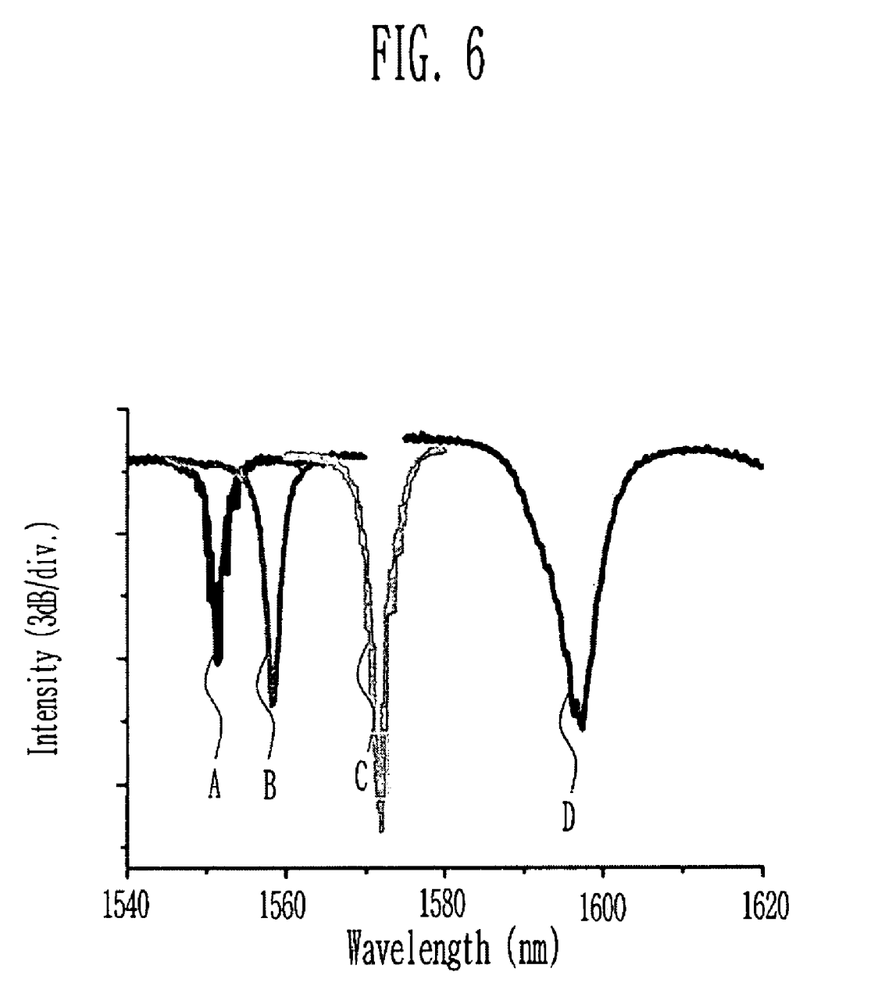
FIG. 6 is a graph showing optical characteristics of the thermally actuated wavelength tunable filter according to the first embodiment of the present invention.

FIG. 6 is a graph showing optical characteristic of the wavelength tunable filter according to the first embodiment of the present invention.

In the present invention, the mirrors 31 and 32 are made of $GaAs/Al_{0.7}Ga_{0.3}As$, the upper and lower mirrors 31 and 32 have 31.5 pairs and 37 pairs, respectively. The diameter of the upper mirror 31 is 40 μm, and the thermal actuators 41 and 42 is 230 μm long, 10 μm wide, and 7.64 μm thick.

The entire wavelength tuning range is 47 nm while the actuation voltage changes from 1 V to 4.6 V, and the maximum consumption power is 5 mW or less. Here, the movement distance of the upper mirror 31 is 132 nm. If the same structure is actuated with an electrostatic force, we expect that the maximum voltage needs 26 V. Accordingly, we can easily appreciate that the present invention can reduce the maximum actuation voltage to ⅕ V or less, comparing with that of the prior art structure actuated by an electrostatic force.

In the graph, lines A, B, C and D are plotted for optical characteristics at the actuation voltages, 1 V, 2.5 V, 3.8 V and 4.6 V, respectively.

Figure 7:
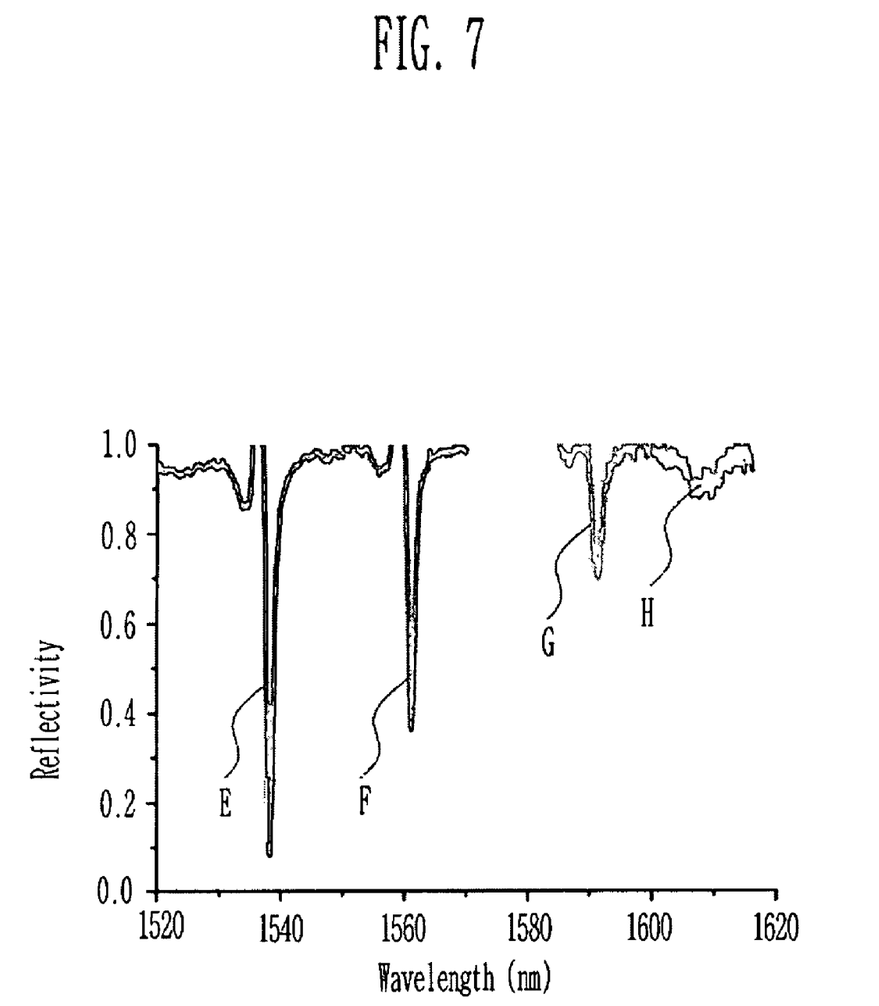
FIG. 7 is a graph showing optical characteristics of the thermally actuated wavelength tunable filter according to the third embodiment of the present invention.

FIG. 7 is a graph showing optical characteristic of the wavelength tunable filter according to the third embodiment of the present invention.

In the present invention, the mirrors 31 and 32 are made of $GaAs/Al_{0.7}Ga_{0.3}As$, the upper and lower mirrors 31 and 32 have 21.5 pairs and 27 pairs, respectively. The diameter of the upper mirror 31 is 40 μm, and the thermal actuators 41 and 42 is 200 μm long, 7 μm wide, and 5.2 μm thick.

When the maximum voltage is 1.7 V, the maximum consumption power is 0.92 mW, and the entire wavelength tuning range is 69 nm. Here, the movement distance of the upper mirror 31 is 225 nm. If the same structure is actuated with an electrostatic force, it is expected that the maximum voltage needs about 64 V. Accordingly, it can be seen that the present invention can be actuated only by the CMOS circuit because of low actuation voltage, and can considerably reduce the consumption power, comparing with that of the prior art. In the graph, lines E, F, G, and H are plotted for optical characteristics at the actuation voltages, 0 V, 1.0 V, 1.5 V and 1.7 V, respectively.

As set forth above, all structures of the wavelength tunable filter are formed on a single substrate, and the electrical current flows through the thermal actuators supporting the mirror, thereby the mirror is actuated by the thermal expansion of the thermal actuators. Accordingly, each thickness of the upper and lower mirrors and the sacrificial layer can be precisely adjusted during the crystal growth, the manufacturing method does not include the process of forming a curved mirror by use of a stress to prevent a sticking phenomenon. Accordingly the initial transmission wavelength can be reproduced constantly regarding all the elements. Also, in the prior art structure assembling the mirrors formed in the different substrates, since the distance between the two mirrors is tens of μm, the wavelength tuning range is limited by the FSR rather than the actuation range. However, in the wavelength tunable filter of the present invention, since the distance between the two mirrors can be precisely adjusted to a thickness of several μm, FSR is much larger than the actuation range, thereby a relatively wider wavelength tuning range can be realized.

The thermally actuated wavelength tunable filter for manufacturing and assembling the two mirrors in the different substrates needs an assembling process of joining the two substrates facing each other. In this process, one of the mirrors is convexly manufactured to prevent the sticking phenomenon of the two mirrors. Therefore, if the beam waist of the incident light is not adjusted to a specific value according to the curvature of the mirror, the insertion loss is increased and the resulting line width becomes wide. Also, in the element using a cantilever type actuator, as the actuation range increases, the line width increases due to the mirror slope. But, in the present invention, all the two mirrors can be manufactured in a plane form, and the thermal actuators are arranged so that the two mirrors keep parallel within the entire actuation range. Thus, the identical optical characteristic can be obtained without the change of line width with respect to any wavelength, if the beam diameter of the light is less than the diameter of the mirror. As a result it shows the identical performance in the entire wavelength tuning band. Since an additional alignment and a mode adjustment process are not required, time and cost can be saved in the manufacturing and assembling processes.

Also, since the thermal expansion is performed by heat generated from electrical current flowing directly through the thermal actuators, it is possible to actuate the filter with very low consumption power. Comparing with the prior art actuated by an electrostatic force, the present can be actuated with a very low voltage. Therefore, the present invention does not need any additional high voltage generator and minimizes the possibility of sticking phenomenon due to the electrostatic force during the actuation.

This invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, the thickness of layers and regions are exaggerated for clarity. Like numbers refer to like elements throughout the specification.

The present application contains subject matter related to korean patent application no. 2003-79987,filed in the Korean Patent Office on Nov. 13, 2003,the entire contents of which being incorporated herein by reference.

What is claimed is:

1. A wavelength tunable optical filter, comprising:

two optical fibers or optical waveguides having optical axes aligned to each other;

lenses for incident light and output light positioned between the optical fibers or optical waveguides;

a first mirror and a second mirror positioned between the lenses and formed to face each other with an air gap formed therebetween; and thermal actuators supporting the first mirror, wherein the first mirror is actuated in any one of upward and downward directions by thermal expansion of the thermal actuator caused by an electrical current, and wherein both sides of the first mirror are connected to inner ends of thermal actuators, and wherein spacers are inserted between each outer end of the thermal actuators and each end of the second mirror which has a length elongated to outer ends of the thermal actuators, so as to keep a predetermined distance therebetween.

2. The wavelength tunable optical filter according to claim 1, wherein each end of the thermal actuators is provided with an electrode so that the electrical current flows.

3. The wavelength tunable optical filter according to claim 1, wherein the thermal actuators are formed to be parallel to both sides of the first mirror and connected to the first mirror by supporters.

4. The wavelength tunable optical filter according to claim 3, wherein each end of the thermal actuators is provided with an electrode so that the electrical current flows.

5. The wavelength tunable optical filter according to claim 1, wherein the thermal actuators are connected to both sides of the first mirror, and wherein spring members are connected to both of other sides of the first mirror or the thermal actuators to prevent sloping.

6. The wavelength tunable optical filter according to claim 5, wherein each end of the thermal actuators is provided with an electrode so that the electrical current flows.

7. The wavelength tunable optical filter according to claim 1, wherein the thermal actuators have different upper and lower resistances.

8. The wavelength tunable optical filter according to claim 1, further comprising a permanent magnet or an electromagnet for forming magnetic fields in a direction perpendicular to that of the electrical current flowing through the thermal actuators.

9. The wavelength tunable optical filter according to claim 1, wherein the thermal actuators have resistance values forming a wheatstone bridge.

* * * * *